United States Patent
Wang et al.

(10) Patent No.: US 10,684,792 B2
(45) Date of Patent: Jun. 16, 2020

(54) METHOD AND SYSTEM FOR MANAGING STORAGE DEVICE OF ELECTRONIC DEVICE BY ALTERNATIVE ELECTRONIC DEVICE

(71) Applicant: LENOVO (BEIJING) CO., LTD., Beijing (CN)

(72) Inventors: Yuancheng Wang, Beijing (CN); Liang Yang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/025,674

(22) Filed: Jul. 2, 2018

(65) Prior Publication Data
US 2019/0004732 A1 Jan. 3, 2019

(30) Foreign Application Priority Data
Jun. 30, 2017 (CN) .......................... 2017 1 0531765

(51) Int. Cl.
*G06F 3/06* (2006.01)
(52) U.S. Cl.
CPC .......... *G06F 3/0653* (2013.01); *G06F 3/0604* (2013.01); *G06F 3/0605* (2013.01); *G06F 3/0619* (2013.01); *G06F 3/0625* (2013.01); *G06F 3/0631* (2013.01); *G06F 3/0634* (2013.01); *G06F 3/0673* (2013.01)
(58) Field of Classification Search
CPC .... G06F 3/0653; G06F 3/0604; G06F 3/0605; G06F 3/0619; G06F 3/0625; G06F 3/0631; G06F 3/0634; G06F 3/0673
See application file for complete search history.

(56) References Cited

U.S. PATENT DOCUMENTS

| 8,209,287 B2* | 6/2012 | Thapa | G06F 1/3209 707/636 |
| 2002/0133539 A1* | 9/2002 | Monday | G06F 3/0607 709/203 |
| 2007/0260822 A1* | 11/2007 | Adams | H04M 1/7253 711/147 |
| 2008/0034004 A1* | 2/2008 | Cisler | G06F 11/1448 |
| 2016/0188235 A1* | 6/2016 | Lemelev | G06F 11/1446 711/162 |
| 2017/0161211 A1* | 6/2017 | Doherty | G06F 16/122 |

(Continued)

FOREIGN PATENT DOCUMENTS

| CN | 1609821 A | 4/2005 |
| CN | 1815987 A | 8/2006 |

(Continued)

*Primary Examiner* — Tracy A Warren
(74) *Attorney, Agent, or Firm* — Anova Law Group, PLLC (57) ABSTRACT

A method for managing a storage device of a first electronic device is provided. The method for managing a storage device of a first electronic device including detecting a storage capacity of the storage device in response to a second electronic device accessing the storage device; and sending a trigger signal to a processor in response to detecting that the storage capacity meets a threshold, the trigger signal sending the first electronic device into an operating mode, wherein the first electronic device includes the processor and a network connector, and the second electronic device accesses the storage device through the network connector.

18 Claims, 4 Drawing Sheets

(56) References Cited

U.S. PATENT DOCUMENTS

2017/0187784 A1* 6/2017 Lee .................. G06F 16/24578
2017/0293433 A1* 10/2017 Brettell ................ G06F 3/0607
2018/0285219 A1* 10/2018 Donlan ............... G06F 11/1662

FOREIGN PATENT DOCUMENTS

| CN | 106155595 A | 11/2016 |
| CN | 106686131 A | 5/2017 |

* cited by examiner

METHOD AND SYSTEM FOR MANAGING STORAGE DEVICE OF ELECTRONIC DEVICE BY ALTERNATIVE ELECTRONIC DEVICE

CROSS-REFERENCES TO RELATED APPLICATIONS

This application claims the priority of Chinese Patent Application No. 201710531765.1, entitled "Method, Electronic Device, and Computer-Readable Storage Medium for Managing Storage Device of Electronic Device," filed on Jun. 30, 2017, the entire content of which is incorporated herein by reference.

FIELD OF THE DISCLOSURE

The present disclosure relates to the field of computer technologies and, more particularly, relates to a storage device management of an electronic device and the related electronic device.

BACKGROUND

With the rapid development of electronic technologies, a variety of electronic devices are widely used in difference scenarios. In a certain network user scenario, users might want to be able to access a storage device through a plurality of electronic devices, and to perform read and/or write operations on the storage device to enable and facilitate information interaction and use.

However, if a storage capacity of the storage device is insufficient, the plurality of electronic devices would not be able to continuously operate on the storage device.

BRIEF SUMMARY OF THE DISCLOSURE

A method, an electronic device, and a computer-readable storage medium for managing a storage device of an electronic device are provide. One aspect of the present disclosure provides a method for managing a storage device of an electronic device.

One aspect of the present disclosure provides a method for managing a storage device of a first electronic device. The method includes detecting a storage capacity of the storage device in response to a second electronic device accessing the storage device; and sending a trigger signal to a processor in response to detecting that the storage capacity meets a threshold, the trigger signal sending the first electronic device into an operating mode, wherein the first electronic device includes the processor and a network connector, and the second electronic device accesses the storage device through the network connector.

Another aspect of the present disclosure provides an electronic device for managing a storage device. The electronic device, may include a storage device; a processor; and a network connector. The electronic device accesses the storage device. A second electronic device accesses the storage device through the network connector. The electronic device detects a storage capacity of the storage device. The electronic device sends a trigger signal to the processor in response to detecting that the storage capacity meets a threshold, the trigger signal sending the electronic device into an operating mode.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

For a more complete understanding of the present disclosure and the advantages of the present disclosure, reference is now made to the following descriptions in reference to the accompanying drawings, in which.

DETAILED DESCRIPTION

Hereinafter, embodiments of the present disclosure will be described with reference to the accompanying drawings. It should be understood, however, that these descriptions are merely for illustrative purposes and are not intended to limit the scope of the disclosure. In addition, in the following paragraphs, descriptions of well-known structures and techniques are omitted to avoid unnecessarily obscuring the concepts of the present disclosure.

The terms used herein are for the purpose of describing particular embodiments only and are not intended to limit the disclosure. The terms "a", "an" and "the" and the like, as used herein, should also include the meaning of "a plurality," "a variety of" unless the context clearly dictates otherwise. Furthermore, the terms "include," "include," and the like, as used herein, indicate the presence of stated features, steps, operations, and/or components, but do not preclude the presence or addition of one or more other features, steps, operations, or components.

All terms including technical and scientific terms used herein have the meaning as commonly understood by one of ordinary skill in the art, unless otherwise defined. It should be noted that terms used herein should be interpreted as having a meaning that is consistent with the context of the present descriptions.

In the drawings, block diagrams and/or flow charts are illustrated. It should be understood that some blocks in the block diagrams and/or the follow charts, or combinations thereof may be implemented by computer program instructions. These computer program instructions may be provided to a processor of a general-purpose computer, special-purpose computer, or any other programmable data processing apparatus such that the instructions, when executed by the processor, enable the processor to implement the functions/operations illustrated in these block diagrams and/or flow charts.

Accordingly, the embodiments of the present disclosure may be implemented in the form of hardware and/or software (including firmware, microcode, etc.). In addition, the embodiments of the present disclosure may be implemented in the form of a computer program product on a computer readable medium in which the instructions are stored. And the computer program product may be used by or in connection with a computer instruction execution system. In the context of the present disclosure, the computer readable medium may refer to any medium that can contain, store, communicate, propagate, or transport the instructions. For example, the computer readable media may include but are not limited to electrical, magnetic, optical, electromagnetic, infrared, or semiconductor systems, devices, devices, or propagation medium. Specific examples of the computer readable medium may include a magnetic storage device such as a magnetic tape or a hard disk (HDD); an optical storage device such as a compact disc (CD-ROM); a memory such as a random-access memory (RAM) or a flash memory; and/or wireless/wired communication link.

One aspect of embodiments of the present disclosure provides a method for managing a storage device of an electronic device and an electronic device applying the method. The electronic device may include a network connector and a processor. If the storage device is connected to the network connector, another electronic device can access the storage device through the network connector. The method may include detecting a storage capacity of the storage device if the storage device is connected to the network connector, and sending a trigger signal to the processor in response to the requested storage capacity meeting or exceeding a threshold. The trigger signal may be used to control the electronic device to enter an operating mode.

Figure 1:
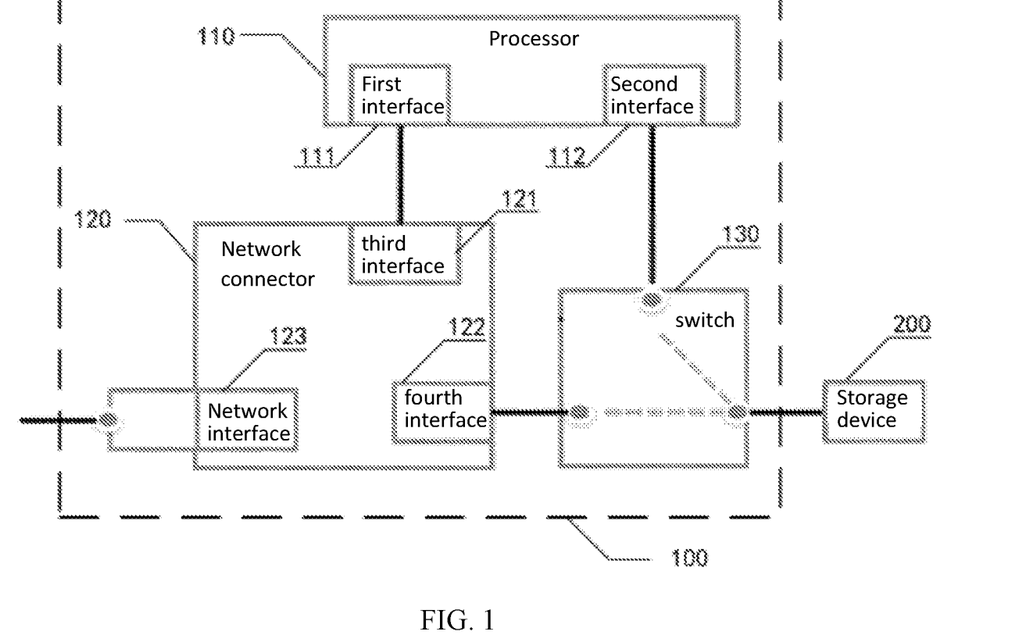
FIG. 1 illustrates an application of a method for managing a storage device of an electronic device according to some embodiments of the present disclosure.

FIG. 1 illustrates an application of a method for managing a storage device of an electronic device according to some embodiments of the present disclosure.

As shown in FIG. 1, the electronic device 100 may include a processor 110, a network connector 120, and a switch 130. The electronic device 100 may be connected to the storage device 200.

According to some embodiments of the present disclosure, the processor 110 may be connected to the network connector 120. The switch 130 may be configured to control the storage device 200 to be connected to the processor 110 or to the network connector 120, respectively, to connect between the storage device 200 and the electronic device 100.

If the storage device 200 is connected to the processor 110 of the electronic device 100, the electronic device 100 may access the storage device 200 and read from and write into the storage device 200.

If the storage device 200 is connected to the network connector 120 of the electronic device 100, another electronic device that is different from the electronic device 100 may access the storage device 200 through the network connector 120 and read from and write into the storage device 200.

As shown in FIG. 1, the processor 110 may include a first interface 111 and a second interface 112. In some embodiments, the processor 110 may include a chipset on a main circuit board of the electronic device 100 or a central processing unit (CPU) of the electronic device 100.

In some embodiments, the first interface 111 of the processor 110 may include, for example, a Peripheral Component Interconnect (PCI) Express graphics card slot, and may be configured to support higher-level power management, hot swapping, data synchronous transmission, and the like. The processor 110 may be connected to the network connector 120 through the first interface 111.

In some embodiments, the second interface 112 of the processor 110 may include, for example, a Universal Serial Bus (USB), and may be configured to support functions such as plug-and-play and hot swapping. The second interface 112 may be connected to the storage device 200 through the switch 130.

The network connector 120 may include a third interface 121, a fourth interface 122, and a network interface 123. The network connector 120 may include, for example, a network card or a graphics card with a processing function, such as an RTL8117 wireless network card.

In some embodiments, the third interface 121 of the network connector 120 may include, for example, a PCI Express interface corresponding to the first interface 111. According to some embodiments of the present disclosure, the third interface 121 may be connected to the first interface 111 to enable the interaction between the processor 110 and the network connector 120.

In some embodiments, the fourth interface 122 of the network connector 120 may include, for example, a Universal Serial Bus (USB), and may be configured to support functions such as plug-and-play and hot plugging. The fourth interface 122 may be connected to the storage device 200 through the switch 130.

The network connector 120 may include the network interface 123. Another electronic device that is different from the electronic device 100 may be connected to the network interface 123 through a network connection. According to some embodiments of the present disclosure, the network connection may include various connection types such as wired connections, wireless communications, optical fiber cable connections, and the like.

According to some embodiments of the present disclosure, the switch 130 may be connected to the storage device 200. The switch 130 may be configured to control the storage device 200 connected to the second interface 112, to connect between the storage device 200 and the processor 110. The switch 130 may also be configured to control the storage device 200 connected to the fourth interface 122, to connect between the storage device 200 and the network connector 120.

The memory device 200 may include a magnetic memory, a semiconductor memory, or an optical memory. The storage device 200 may be a storage device or a storage device cluster. The present disclosure does not limit a type and number of the storage device.

According to some embodiments of the present disclosure, a plurality of electronic devices may access the same storage device through the network connector to facilitate information exchange between the users and to improve the user experience.

However, in a scenario where a plurality of electronic devices is configured to read from and write into the storage device, when any of the electronic devices reads and writes the storage device through the network connector, and the storage capacity of the storage device is not sufficient, the electronic device then cannot continue an operation on the storage device.

According to the application scenario illustrated in FIG. 1, some embodiments of the present disclosure provide the method for managing the storage device of the electronic device.

Figure 2:
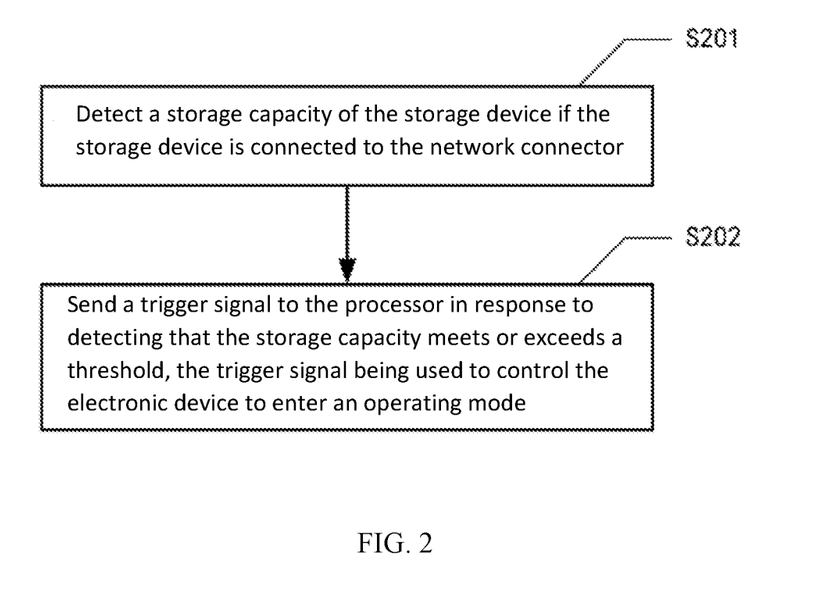
FIG. 2 shows a flow diagram of another method for managing a storage device of an electronic device according to some embodiments of the present disclosure.

FIG. 2 shows a flow diagram of another method for managing a storage device of an electronic device according to some embodiments of the present disclosure.

As shown in FIG. 2, the method may include steps S201 to S202.

In S201: When the storage device 200 is connected to the network connector 120, the storage capacity of the storage device 200 may be detected. When the storage device 200 is connected to the network connector 120, another electronic device may access the storage device 200 through the network connector 120.

According to some embodiments of the present disclosure, when the storage device 200 is connected to the network connector 120, the storage capacity of the storage device 200 may be detected by the network connector 120.

The network connector 120 may detect the storage capacity of the connected storage device 200 by detecting the storage capacity in real-time, detecting at certain durations, detecting in response to the storage device 200 being connected to the network connector 120, or detecting in response to an electronic device performing a writing operation on the storage device.

According to some embodiments of the present disclosure, detecting the storage capacity of the storage device 200 may include detecting a current storage capacity of the storage device 200, or detecting, according to a write operation of another electronic device, a storage capacity of the current storage capacity of the storage device 200 in addition to the content of the write operation. For example, if the current storage capacity is 4 GB, and the network connector 120 receives a write operation request from another electronic device, the other electronic device may request to write content of 1 GB capacity to the storage device 200. The requested storage capacity of the storage device 200 may be 5 GB.

In S202: In response to detecting that the storage capacity meets or exceeds a threshold, a trigger signal may be sent to the processor 110 of the electronic device 100. And the trigger signal may be used to control the electronic device 100 to enter an operating mode.

According to some embodiments of the present disclosure, if it is detected that the storage capacity of the storage device 200 meets or exceeds the threshold, the trigger signal may be sent to the processor 110 through the network connector 120.

The threshold value that the requested storage capacity meets or exceeds may be a preset threshold, for example, 80% of the storage capacity of the storage device 200. That is, if the requested storage capacity has reached or exceeds 80% of the total capacity that can be used on storage device 200, it may indicate that the requested storage capacity has been reached or exceeds the threshold.

The storage capacity meeting or exceeding the threshold may include the current storage capacity of the storage device meeting or exceeding the threshold, or may include the storage capacity, after the write operation of another electronic device, meeting or exceeding the threshold.

In some embodiments of the present disclosure, the trigger signal may be used to control the electronic device to enter the operating mode. The processor 110 of the electronic device 100 may control the electronic device 100 to enter the operating mode in response to the trigger signal. Alternatively, the network connector 120 of the electronic device 100 may control the electronic device 100 to enter the operating mode in response to the trigger signal.

The trigger signal may inform the processor 110 of the electronic device 100 that the storage capacity of the storage device 200 meets or exceeds the threshold, so that the processor 110 would respond to it.

Controlling the electronic device 100 to enter the operating mode may include controlling the electronic device 100 to turn it on. According to some embodiments of the present disclosure, turning the electronic device on may include configuring a CPU, a BIOS, an operating system, the storage device, an external device and the like of the electronic device 100 to a state for operations.

According to some embodiments of the present disclosure, when the storage device 200 is connected to the network connector 120, the storage capacity of the storage device 200 is detected. If the storage capacity exceeds the threshold, the electronic device may be controlled to turn on. The electronic device 100 may be triggered to turn on if the storage capacity is not sufficient, so that the electronic device 100 can respond to the problem of insufficient storage capacity.

According to the method illustrated in FIG. 2, some embodiments of the present disclosure provide the method for managing the storage device after the electronic device enters the operating mode.

Figure 3:
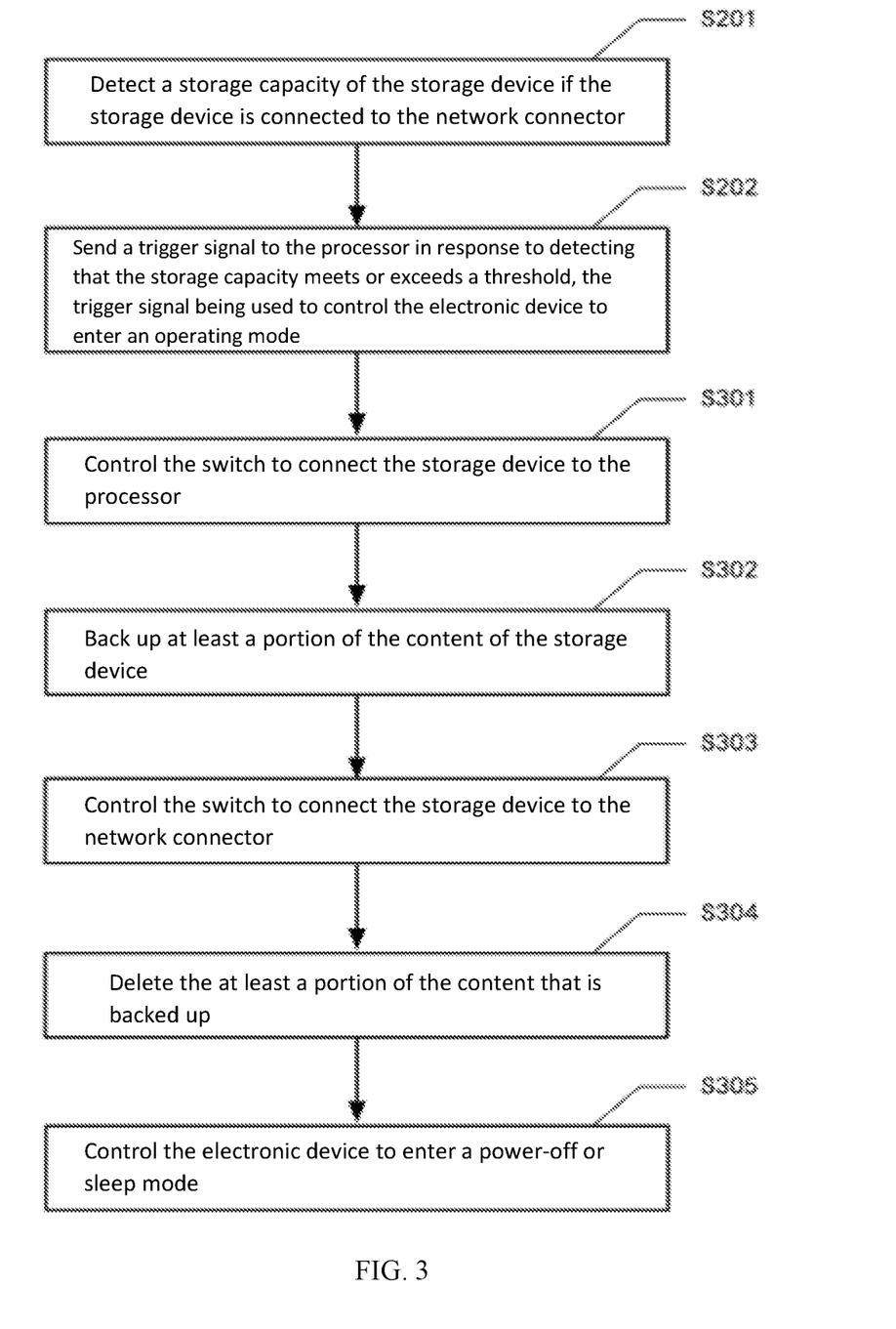
FIG. 3 shows a flow diagram of still another method for managing a storage device of an electronic device according to some embodiments of the present disclosure.

FIG. 3 shows a flow diagram of still another method for managing a storage device of an electronic device according to another embodiment of the present disclosure.

As shown, FIG. 3 includes steps S201 to S202, and S301 to S305.

In S301: The switch may be controlled to connect the storage device to the processor.

According to some embodiments of the present disclosure, controlling the switch 130 to connect the storage device 200 to the processor 110 may include controlling the switch 130 to connect the storage device 200 to the processor 110 by the network connector 120 in response to detecting that the storage capacity meets or exceeds a threshold.

For example, when detecting that the storage capacity of the storage device 200 meets or exceeds the threshold, the network connector 120 may be configured to control the switch 130 to switch the storage device 200 to be connected to the processor 110. In some embodiments of the present disclosure, when detecting that the storage capacity of the storage device meets or exceeds the threshold, the network connector 120 may also be configured to send the trigger signal to the processor 110 simultaneously.

controlling the switch to connect the storage device to the processor may include controlling the switch to connect the storage device to the processor by the processor in response to the trigger signal.

For example, after S202, the processor 110 receives the trigger signal, enters the operating mode, and is notified that the storage capacity of the storage device 200 meets or exceeds the threshold. Therefore, the processor 110 may, in response to the trigger signal, control the switch 130 to switch the storage device 200 to be connected to the processor 110.

According to some embodiments of the present disclosure, the storage device 200 is switched to be connected to the processor 110 in order to facilitate the processor 110 of the electronic device 100 to access and operate the storage device 200.

In S302: The processor 110 may be configured to back up at least a portion of the content of the storage device.

According to some embodiments of the present disclosure, the processor 110 may be configured to back up at least a portion of the content of the storage device 200. The backup process may include requesting the processor 110 to back up the at least a portion of the content of the storage device 200 by the network connector 120 in response to detecting that the storage capacity meets or exceeds the threshold.

For example, when the network connector 120 detects that the storage capacity of the storage device 200 meets or exceeds the threshold, the network connector 120 may be configured to send a request to the processor 110, and the processor 110 may back up the at least a portion of the content of the storage device 200 in response to the request.

The processor 110 may back up the at least a portion of the content of the storage device 200 in response to the trigger signal.

For example, the processor 110 may control the electronic device 100 to enter the operating mode in response to the trigger signal. The trigger signal may include a notification massage to inform the electronic device 100 that the storage device 200 is insufficient in storage capacity. After the processor 100 controls the electronic device 100 to enter the operating mode, the processor 100 may be configured to back up the at least a portion of the content of the storage device 200.

In some embodiments of the present disclosure, backing up the at least a portion of the content of the storage device 200 may include backing up the content of the storage device 200 that is less accessed, such as, backing up the content that has an accessed time less than a certain threshold.

According to some embodiments of the present disclosure, by backing up the at least a portion of the content of the storage device 200, content loss in the storage device 200 can be avoided.

In S303: The switch 130 may be controlled to connect the storage device 200 to the network connector 120.

According to some embodiments of the present disclosure, controlling the switch 130 to connect the storage device 200 to the network connector 120 may include controlling the switch 130 to connect the storage device 200 to the network connector 120 in response to the processor 110 completing backup of the at least a portion of the content of the storage device 200.

For example, the processor 110 may be configured to send a completion signal to the network connector 120 upon completing the backup of the at least a portion of a stored content of the storage device 200. The network connector 120 may control the switch 130 to connect the storage device 200 to the network connector 120 in response to the completion signal.

Controlling the switch 130 to connect the storage device 200 to the network connector 120 may also include controlling the switch 130 to connect the storage device 200 to the network connector 120 after the processor 110 completes the backup of the at least a portion of the stored content of the storage device 200.

For example, the processor 110 may be configured to control the switch 130 to connect the storage device 200 to the network connector 120 after completing the backup of the at least a portion of the stored content the storage device 200.

In S304: The method may include deleting at least a portion of the stored content that is backed up.

According to some embodiments of the present disclosure, deleting the at least a portion of the stored content that is backed up may include deleting the at least a portion of the stored content by the network connector 120 in response to the processor 110 completing the backup of the at least a portion of the stored content of the storage device 200.

For example, the processor 110 may send a completion signal to the network connector 120 upon completing the backup of the at least a portion of the stored content of the storage device 200. In response to the completion signal, the network connector 120 may control the switch 130 to connect the storage device 200 to the network connector 120. After the storage device 200 is connected to the network connector 120, the at least a portion of the stored content that is backed up in the storage device 200 may be deleted.

Deleting the at least a portion of the stored content that is backed up may also include deleting the at least a portion of the stored content after the processor 120 completes the backup of the at least a portion of the stored content of the storage device 200.

For example, the processor 110 may delete the at least a portion of the stored content after completing the backup of the at least a portion of the stored content of the storage device 200.

According to some embodiments of the present disclosure, by deleting the backed-up content, it may free up a certain amount of storage space for the storage device 200 to store new content from another electronic device that accesses to read and write.

In S305: The electronic device 100 may be controlled to enter a power-off or sleep mode.

According to some embodiments of the present disclosure, controlling the electronic device 100 to enter a power-off or sleep mode may include that automatically controlling, by the processor 110, the electronic device 100 to enter the power-off or sleep mode after the processor 100 completes the backup of the at least a portion of the stored content the storage device 200.

Controlling the electronic device 100 to enter the power-off or sleep mode may also include sending, by the network connector 120 in response to the processor 110 completing the backup of the at least a portion of the stored content of the storage device 200, a sleep signal to the processor 110. The sleep signal may be used to set the electronic device 100 to enter the power-off or sleep mode.

For example, the processor 110 may be configured to send the completion signal to the network connector 120 after completing the backup of the at least a portion of the stored content of the storage device 200. The network connector 120 may send the sleep signal to the processor 110 in response to the completion signal to control the electronic device 100 to enter the power-off or sleep mode, such as, controlling the electronic device to enter an S5 power-off state.

According to some embodiments of the present disclosure, after the processor 110 completes the backup of the content of the storage device 200, the electronic device may be controlled to be powered off or into sleep to save power. It would not affect the ability for another electronic device to access the storage device 200.

It should be understood that, the methods described above with reference to FIG. 3 in the present disclosure are merely some of the embodiments. The present disclosure does not limit an order of the operations. For example, the backed-up content may be deleted first, and then the storage device 200 may be connected to the network connector 120. Alternatively, for example, the storage device 200 may be connected to the network connector 120 first, and then the backed-up content can be deleted. In another example, the storage device 200 may be connected to the network connector 120 first, and then the electronic device 100 may be controlled to enter the power-off or sleep mode. Alternatively, the electronic device 100 may be controlled to enter the power-off or sleep mode first, and then the storage device 200 may be connected to the network connector 120. It should be understood that the present disclosure is not limited to the embodiments in the foregoing descriptions, and various combinations and/or modifications are possible between the stated operations.

According to some embodiments of the present disclosure, when the storage device 200 is connected to the network connector 120, the storage capacity of the storage device 200 may be detected. If the storage capacity exceeds the threshold, at least a portion of the content of the storage capacity may be backed up. And the backed-up content may be deleted to release more storage space to facilitate any electronic device to perform read and/or write operations, so that it does not result in data loss.

Figure 4:
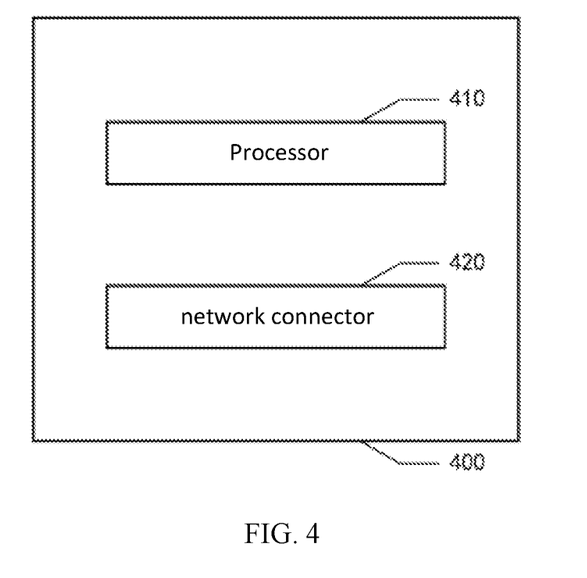
FIG. 4 shows a block diagram of an electronic device according to some embodiments of the present disclosure.

In reference to FIG. 4, the following description will describe an electronic device applying the disclosed method for managing a storage device of an electronic device according to some exemplary embodiments of the present invention in detail.

One aspect of the present disclosure provides an electronic device.

FIG. 4 shows a block diagram of an electronic device according to another embodiment of the present disclosure.

As shown in FIG. 4, the electronic device 400 may include a processor 410 and a network connector 420. The electronic device 400 may be connected to the storage device.

The processor 410, if connected to the storage device, can directly access the storage device.

When the network connector 420 is connected to the storage device, another electronic device can access the storage device through the network connector.

In some embodiments, when the storage device is connected to the network connector 420, the electronic device 400 may detect the storage capacity of the storage device. According to some embodiments of the present disclosure, the electronic device 400 may detect the storage capacity of the storage device, including that the network connector 420 of the electronic device may detect the storage capacity of the storage device. For example, the network connector 420 may perform S201 as described above with reference to FIG. 2, and details are not repeated herein again.

In response to detecting that the storage capacity meets or exceeds a threshold, the electronic device 400 may send a trigger signal to the processor 410. The trigger signal may be used to control the electronic device 400 to enter an operating mode. According to some embodiments of the present disclosure, sending the trigger signal to the processor 410 may include sending, by the network connector 420 of the electronic device, the trigger signal to the processor 410. For example, the network connector 420 may perform S202 as described above with reference to FIG. 2, and details are not repeated herein again.

According to some embodiments of the present disclosure, when the storage device is connected to the network connector 420, the storage capacity of the storage device may be detected. If the storage capacity exceeds the threshold, the electronic device 400 may be turned on. Accordingly, the electronic device may be triggered when the storage capacity is insufficient so that the electronic device can resolve the problem of insufficient storage capacity.

Figure 5:
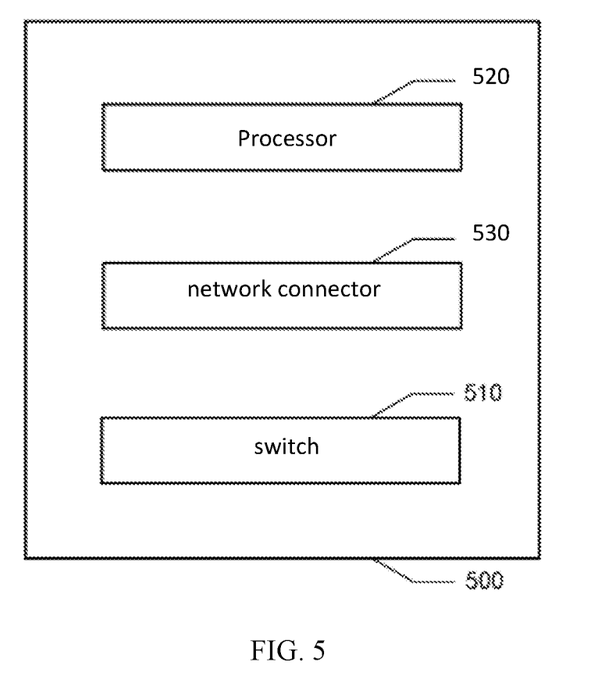
FIG. 5 shows a block diagram of another electronic device according to some embodiments of the present disclosure.

FIG. 5 shows a block diagram of another electronic device according to another embodiment of the present disclosure.

As shown in FIG. 5, the electronic device 500 may include a processor 520, a network connector 530, and a switch 510. The electronic device 500 may be connected to the storage device.

In some embodiments of the present disclosure, the network connector 530 may be configured to control the switch 510 to connect the storage device to the processor 520 in response to detecting that the storage capacity meets or exceeds the threshold. Alternatively, the processor 520 may be configured to control the switch 510 to connect the storage device to the processor 520 in response to the trigger signal. The detailed embodiment is described in relation to S301 described above with reference to FIG. 3, and details are not repeated herein again.

According to some embodiments of the present disclosure, the network connector 530 may be configured to request the processor 520 to back up the at least a portion of the content of the storage device in response to detecting that the storage capacity meets or exceeds the threshold. Alternatively, the processor 520 may be configured to back up the at least a portion of the content of the storage device in response to the trigger signal. The detailed embodiment is described in relation to S302 described above with reference to FIG. 3, and details are not repeated herein again.

According to some embodiments of the present disclosure, the network connector 530 may be configured to control the switch 510 to connect the storage device to the network connector 530 in response to the processor 520 completing the backup of the at least a portion of the stored content of the storage device. Alternatively, the processor 520 may be configured to control the switch 510 to connect the storage device to the network connector 530 upon completing the backup of the at least a portion of the stored content of the storage device. The detailed description of the embodiment is described in relation to S303 described above with reference to FIG. 3, and details are not repeated herein again.

According to some embodiments of the present disclosure, the network connector 530 may be configured to delete the at least a portion of the stored content in response to the processor 520 completing the backup of the at least a portion of the stored content of the storage device. Alternatively, the processor 520 may be configured to delete the at least a portion of the stored content upon completing the backup of the at least a portion of the stored content of the storage device. The detailed embodiment is described in relation to S304 described above with reference to FIG. 3, and details are not repeated herein again.

According to some embodiments of the present disclosure, the processor 520 may be configured to automatically control the electronic device 500 to enter the power-off or sleep mode upon completing the backup of the at least a portion of the stored content of the storage device. Alternatively, the network connector 530 may be configured to send the sleep signal to the processor 520 in response to the processor 520 completing the at least a portion of the stored content of the storage device. The sleep signal may be used to control the electronic device 500 to enter the power-off or sleep mode. The detailed embodiment is described in relation to S305 described above with reference to FIG. 3, and details are not repeated herein again.

According to some embodiment of the present disclosure, when the storage device is connected to the network connector 530, the storage device may be configured to detect the storage capacity of the storage device. If the storage capacity exceeds the threshold, a portion of the storage capacity may be backed up. And the backed-up content may be deleted to release more storage space to facilitate another electronic device to perform read and write operations so that it does not result in data loss.

Figure 6:
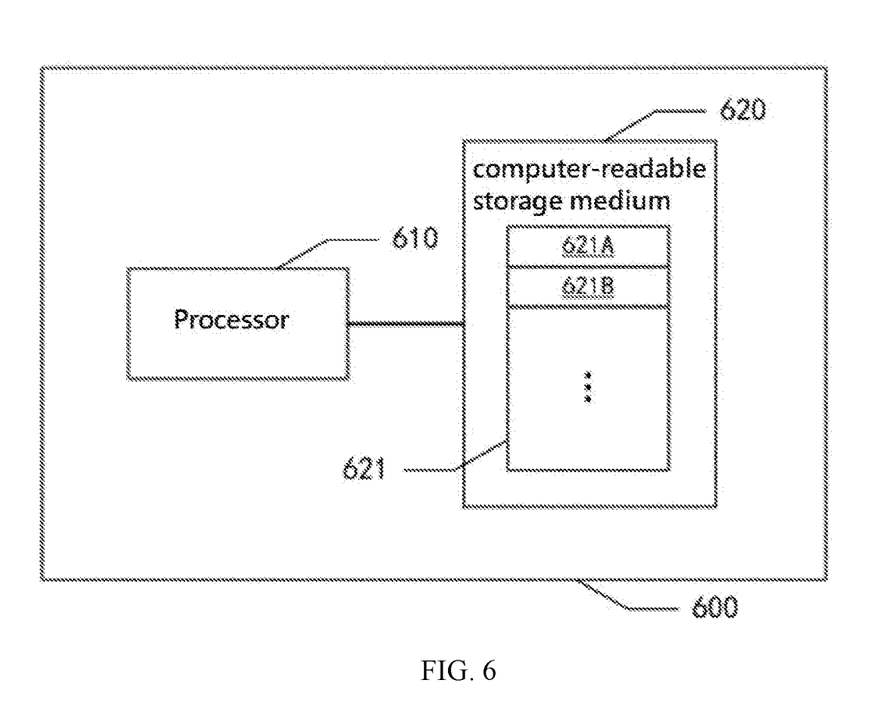
FIG. 6 shows a block diagram of still another electronic device according to some embodiments of the present disclosure.

FIG. 6 shows a block diagram of still another electronic device according to still another embodiment of the present disclosure.

As shown in FIG. 6, the electronic device 600 may include a processor 610 and a computer-readable storage medium 620.

In embodiments of the present disclosure, when implemented in software, various functions can be written in an appropriate language such as, but not limited to, C # or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In some embodiments, the processor 610 may include, for example, a general-purpose microprocessor, an instruction-set processor and/or an associated chipset and/or a special purpose microprocessor (e.g., an application specific integrated circuit (ASIC)), and the like. The processor 610 may also include an on-board memory for caching purposes. The processor 610 may be a single processing unit or a plurality of processing units for performing corresponding operations of the method flow according to the embodiments of the present disclosure described with reference to FIG. 2 to FIG. 3.

The computer-readable storage medium 620, for example, may include any medium that can contain, store, communicate, propagate, or transport the instructions. For example, the readable storage media may include, but are not limited, to electrical, magnetic, optical, electromagnetic, infrared, or semiconductor systems, devices, devices, or propagation media. Specific examples of the readable storage medium may include a magnetic storage device such as a magnetic tape or a hard disk (HDD), an optical storage device such as a compact disk (CD-ROM); a memory such as random-access memory (RAM) or a flash memory, and/or wireless/wired communication link.

The computer-readable storage media 620 may include a computer program 621, which may include codes/computer-executable instructions that, when executed by the processor 610, cause the processor 610 to execute, for example, the methods described above with reference to FIG. 2 to FIG. 3, and any variations thereof.

The computer program 621 may be nay type of computer program codes, including, for example, a computer program module. For example, in some embodiments, the codes in the computer program 621 may include one or more program modules including, for example, a module 621A, a module 621B, and so on.

According to some embodiments of the present invention, at least one of the processor 410, the network connector 420, and the switch 510 may be implemented as a computer program module described with reference to FIG. 6 which, when executed by the processor 610, may perform the above-described corresponding operations.

For example, the processor 410 may include the processor 610 and the computer-readable storage medium 620 described above to implement the operations performed by the processor 410, such as the operations described above in reference to FIG. 2 to FIG. 3. For another example, the network connector 410 may include the processor 610 and the computer-readable storage medium 620 described above to implement the operations performed by the network connector 420, such as the operations described above in reference to FIG. 2 to FIG. 3.

Those skilled in the art should understand that the features described in the embodiments and/or the claims of the present disclosure may be combined and/or integrated in various ways, even if such combinations and integration are not explicitly described in the present disclosure. In particular, the features described in the various embodiments of the present disclosure and/or the claims may be variously combined and/or integrated without departing from the spirit and teachings of the present disclosure. All such combinations and/or integrations are within the scope of this disclosure.

Although the present disclosure has been shown and described with reference to specific exemplary embodiments of the present disclosure, it will be understood by those skilled in the art that various modifications in form and/or characteristic may be made without departing from the spirit and scope of the present disclosure as defined by the appended claims and equivalences. Therefore, the scope of the present disclosure should not be limited to the above embodiments, but should be determined not only by the appended claims but also by equivalents of the appended claims.

Other embodiments of the disclosure will be apparent to those skilled in the art from consideration of the specification and practice of the disclosure provided herein. It is intended that the specification and examples be considered as exemplary only, with a true scope and spirit of the disclosure being indicated by the claims.

What is claimed is:

1. A method for managing a storage device of a first electronic device, comprising:
   detecting a storage capacity of the storage device in response to a second electronic device accessing the storage device through a network connector; and
   sending a trigger signal to a processor in response to detecting that the storage capacity meets a threshold, the trigger signal sending the first electronic device into an operating mode, wherein the first electronic device includes the processor, the network connector, and a switch; and
   controlling, by the network connector, the switch to connect the storage device to the processor in response to the trigger signal.

2. The method of claim 1, further including:
   detecting the storage capacity of the storage device through the network connector; and
   sending the trigger signal to the processor through the network connector.

3. The method of claim 1, wherein the first electronic device includes the switch, and the method further comprises:
   controlling, by the network connector, the switch to connect the storage device to the processor in response to detecting that the storage capacity meets the threshold.

4. The method of claim 1, further comprising:
   requesting the processor to back up a portion of content of the storage device in response to detecting that the storage capacity meets the threshold.

5. The method of claim 1, further comprising:
   backing up a portion of content of the storage device by the processor in response to the trigger signal.

6. The method of claim 5, further comprising:
deleting, by the network connector, the portion of the backed-up content on the storage device in response to the processor completing backup of the portion of the content of the storage device.

7. The method of claim 5, wherein the first electronic device includes the switch, and the method further comprises:
controlling, by the network connector, the switch to connect the storage device to the network connector in response to the processor completing the backup of the portion of the content of the storage device.

8. The method of claim 5, further comprising:
controlling the first electronic device to enter a power-off or sleep mode upon the processor completing the backup of the portion of the content of the storage device.

9. The method of claim 5, further comprising:
sending a sleep signal to the processor by the network connector in response to the processor completing the backup of the portion of the content of the storage device, the sleep signal sending the first electronic device into the power-off or sleep mode.

10. The method of claim 1, wherein the storage capacity meeting the threshold includes a current storage capacity of the storage device meeting the threshold.

11. The method of claim 1, wherein the storage capacity meeting the threshold includes a current storage capacity together with a requested capacity for a write operation meeting the threshold.

12. The method of claim 1, wherein detecting the storage capacity of the storage device includes detecting at real-time the storage capacity of the storage device, detecting the storage capacity of the storage device at a set interval, detecting the storage capacity of the storage device in response to the storage device being connected to the network connector, or detecting the storage capacity of the storage device in response to the second electronic device performing a writing operation on the storage device.

13. An electronic device, comprising:
storage device;
processor; and
network connector, wherein:
the electronic device accesses the storage device, the electronic device detects a storage capacity of the storage device in response to a second electronic device accessing the storage device through the network connector, and the electronic device sends a trigger signal to the processor in response to detecting that the storage capacity meets a threshold, the trigger signal sending the electronic device into an operating mode, wherein the electronic device further comprises a switch, and
the network connector controls the switch to connect the storage device to the processor in response to the trigger signal.

14. The electronic device of claim 13, wherein:
the network connector requests the processor to back up a portion of content of the storage device in response to detecting that the storage capacity meeting the threshold; or the processor backs up the portion of the content of the storage device in response to the trigger signal.

15. The electronic device of claim 14, wherein:
the network connector deletes the backed-up content on the storage device in response to the processor completing backup of the portion of the content of the storage device.

16. The electronic device of claim 14, further including the switch, wherein:
the network connector controls the switch to connect the storage device to the processor in response to detecting that the storage capacity meets the threshold.

17. The electronic device of claim 14, wherein:
the electronic device enters a power-off or sleep mode upon the processor completing the backup of the portion of the content of the storage device.

18. The electronic device of claim 14, wherein:
the network connector sends a sleep signal to the processor in response to the processor completing the backup of the portion of the content of the storage device, the sleep signal being used to control the electronic device to enter a power-off or sleep mode.

* * * * *